United States Patent
Inazuka et al.

(10) Patent No.: US 8,267,588 B2
(45) Date of Patent: Sep. 18, 2012

(54) FLUID LUBRICATION BEARING DEVICE AND METHOD OF MANUFACTURING THE SAME

(75) Inventors: Yoshiharu Inazuka, Kuwana (JP); Masanori Mizutani, Kuwana (JP)

(73) Assignee: NTN Corporation, Osaka (JP)

(*) Notice: Subject to any disclaimer, the term of this patent is extended or adjusted under 35 U.S.C. 154(b) by 917 days.

(21) Appl. No.: 11/597,619

(22) PCT Filed: Sep. 22, 2005

(86) PCT No.: PCT/JP2005/017470
§ 371 (c)(1),
(2), (4) Date: Sep. 10, 2007

(87) PCT Pub. No.: WO2006/035665
PCT Pub. Date: Apr. 6, 2006

(65) Prior Publication Data
US 2008/0011551 A1    Jan. 17, 2008

(30) Foreign Application Priority Data
Sep. 27, 2004 (JP) ............................... 2004-279932

(51) Int. Cl.
*F16C 32/06* (2006.01)
*B28B 11/12* (2006.01)
*B29C 45/38* (2006.01)

(52) U.S. Cl. .................. 384/114; 425/297; 264/328.9

(58) Field of Classification Search .......... 384/100, 384/107, 114; 425/806, 297, 305.1; 264/161, 264/162, 296, 328.9, 250, 254, 259, 267, 264/268, 279, 328.1
See application file for complete search history.

(56) References Cited

U.S. PATENT DOCUMENTS

| 5,494,631 A * | 2/1996 | Oka et al. ............... 264/161 |
| 2001/0039730 A1 | 11/2001 | Fujita et al. |
| 2004/0017954 A1 | 1/2004 | Komori et al. |

FOREIGN PATENT DOCUMENTS

| JP | 59079739 A * | 5/1984 |
| JP | 60-132314 | 9/1985 |

(Continued)

OTHER PUBLICATIONS

Office Action issued Mar. 23, 2011 in corresponding Japanese Application No. 2005-276412 (with partial English translation).

*Primary Examiner* — Thomas R Hannon
*Assistant Examiner* — Alan Waits
(74) *Attorney, Agent, or Firm* — Wenderoth, Lind & Ponack, L.L.P.

(57) ABSTRACT

Disclosed is a fluid lubrication bearing device in which generation of a contaminant in a resin housing is suppressed, maintaining a high level of cleanliness in the interior and in the periphery of the bearing device. A side portion 7a and a bottom portion 7b of a housing 7 are formed integrally by injection molding of a resin material, and a gate mark 12 of a gate resin portion 11 formed at a lower end surface 7d of the bottom portion 7b of the molding is formed by a jig 13 having a forming surface 13a with a concave configuration. As a result, the cut portion 12a of the gate mark with sharp asperities is smoothened, and the surface 12d of the gate mark 12 is turned into a smooth convex curved surface.

4 Claims, 5 Drawing Sheets

FOREIGN PATENT DOCUMENTS

| | | |
|---|---|---|
| JP | 61-35911 | 2/1986 |
| JP | 61-144232 | 7/1986 |
| JP | 1-202412 | 8/1989 |
| JP | 04045911 A * | 2/1992 |
| JP | 2001-315160 | 11/2001 |
| JP | 2002103377 A * | 4/2002 |
| JP | 2003-25379 | 1/2003 |
| JP | 2003-117946 | 4/2003 |
| JP | 2003-301834 | 10/2003 |
| JP | 2004-52999 | 2/2004 |

* cited by examiner

FLUID LUBRICATION BEARING DEVICE AND METHOD OF MANUFACTURING THE SAME

BACKGROUND OF THE INVENTION

The present invention relates to a fluid lubrication bearing device and a method of manufacturing the same.

A fluid lubrication bearing device supports a shaft member by means of a lubricating film of a fluid generated in a radial bearing gap. Due to its high rotation accuracy, high rotating speed, low cost, and quietness, a bearing device of this type is used in a small motor, for example, a spindle motor for a magnetic disc device, such as an HDD, an optical disc device, such as a CD-ROM, a CD-R/RW, or a DVD-ROM/RAM, a magneto-optical disc device, such as an MD, or an MO, a polygon scanner motor for a laser beam printer (LBP), or a fan motor.

Fluid lubrication bearings of this type are roughly classified into hydrodynamic bearings equipped with a hydrodynamic pressure generating means for generating hydrodynamic pressure in a lubricating oil in a bearing gap, and so-called cylindrical bearings (whose bearing surface is of a perfectly circular configuration) equipped with no hydrodynamic pressure generating means.

For example, in a fluid lubrication bearing device incorporated into the spindle motor of a disc drive device, such as an HDD, there are provided a radial bearing portion supporting a shaft member rotatably in the radial direction in a non-contact manner, and a thrust bearing portion supporting the shaft member rotatably in the thrust direction in a non-contact manner. As the radial bearing portion, there is used a bearing (hydrodynamic bearing) formed by hydrodynamic pressure generating grooves (hydrodynamic pressure grooves) provided on the inner peripheral surface of a bearing sleeve or on the outer peripheral surface of the shaft member. As the thrust bearing portion, there are used, for example, hydrodynamic bearings formed by hydrodynamic pressure grooves provided on both end surfaces of a flange portion of the shaft member or on surfaces opposed thereto (see, for example, JP 2002-61641 A). In some cases, there is used, as a thrust bearing portion, a bearing (a so-called pivot bearing) which supports one end surface of a shaft member in a contact manner by a thrust member (see, for example, JP 11-191943 A).

A fluid lubrication bearing device of this type is composed of a housing, a bearing sleeve, a shaft member, etc., and efforts are being made to enhance the machining precision and assembly precision for each component to secure the high bearing performance as required due to the increasingly improved performance of information apparatuses. On the other hand, with the tendency toward a reduction in the price of information apparatuses, the demand for a reduction in the cost of a fluid lubrication bearing device of this type is becoming more and more strict.

SUMMARY OF THE INVENTION

As a means for achieving a reduction in the cost of a fluid lubrication bearing device of this type, it will be possible to form the housing through molding (injection molding) of a resin material. In the injection molding of the resin, there is provided a gate for filling the cavity of the mold with molten resin, and the molten resin is injected into the cavity through this gate. After the molten resin in the cavity has been cooled and solidified, the mold is opened to extract the molding (housing). Before the opening of the mold, the molding is connected to a gate resin portion formed in the gate, and, as a result of the opening of the mold, the gate resin portion is cut off, and a part of the gate resin portion remains on the molding as a gate mark.

When the mold is opened, the gate resin portion is cut off as if torn away, so that the cut portion of the gate mark remaining on the molding as a part of the gate resin portion forms a rough cut surface with sharp as perities. When the resin material contains a filling material, such as fibers, the filling material is partly exposed. In this case, the filling material or some other foreign matter is likely to be dropped from the gate mark of the housing. The filling material, etc. thus dropped adheres to the surface of the housing, etc., and at the time of assembly of the bearing device, there is a fear of the filling material, etc. mixing into the lubricating oil filling the interior of the bearing device as a contaminant.

It is an object of the present invention to suppress generation of a contaminant in the housing of a fluid lubrication bearing device of this type and to maintain a high level of cleanliness in the interior and in the periphery of the bearing device.

To attain the above object, according to the present invention, there is provided a fluid lubrication bearing device including: a housing; a bearing sleeve arranged inside the housing; a shaft member inserted into an inner periphery of the bearing sleeve; and a radial bearing portion for supporting the shaft member in a radial direction in a non-contact manner with a lubricating film of a fluid generated in a radial bearing gap between the inner peripheral surface of the bearing sleeve and an outer peripheral surface of the shaft member, characterized in that the housing is formed by injection molding of a resin and has a gate mark subjected to forming process.

In this way, by performing forming on the gate mark remaining on the housing after the injection molding, the sharp surface asperities of the cut portion at the gate mark are removed. That is, due to the pressure at the time of forming, the protrusions of the surface asperities at the cut portion are plastically pushed down, so that the surface of the gate mark with asperities is smoothened. Further, the cut surface is covered with the protrusions that have been felled, so that the exposure of the cut surface itself is prevented. Thus, it is possible to suppress dropping of the filling material or some other foreign matter (hereinafter referred to as the "filling material, etc.") from the gate mark. The forming can be effected on the gate mark, for example, by pressing a jig against the gate mark.

After the forming, the gate mark may assume a convex curved surface configuration, for example, a partial convex spherical surface configuration. This configuration can be obtained by using a forming jig formed, for example, in a partial concave spherical configuration. By pressing this jig against the gate mark, the protrusions of the cut portion at the gate mark are guided by the concave forming surface, and are pushed down in the direction in which the forming surface is inclined, so that it is possible to impart regularity to the direction in which the protrusions are felled. Thus, the surface of the gate mark is made smoother.

Further, to attain the above-mentioned object, according to the present invention, there is provided a method of manufacturing a fluid lubrication bearing device including a housing, a bearing sleeve arranged inside the housing, a shaft member inserted into an inner periphery of the bearing sleeve, and a radial bearing portion supporting the shaft member in a radial direction in a non-contact manner with a lubricating film of a fluid generated in a radial bearing gap between the inner peripheral surface of the bearing sleeve and an outer peripheral surface of the shaft member. The method includes forming the housing by injection molding of a resin material, and after mold releasing, forming a gate mark with a jig.

By rotating the jig when performing forming on the gate mark with the jig, the protrusions are pressingly bent while receiving a force in a rotating direction due to a frictional force between them and the forming surface of the jig, whereby it is possible to impart further regularity to the direction in which the protrusions are felled. Further, due to the frictional heat generated during the operation, the resin component is softened, so that the press-bending of the protrusions is further facilitated.

For the above reasons, it is desirable to perform forming on the gate mark of the housing. Further, it is desirable to perform forming on the portion around the gate mark, too. Due to this arrangement, during the forming operation performed on the gate mark, for example, the resin portion at the gate mark (in particular, the resin portion at the cut surface portion) is forced out to the periphery thereof by the forming pressure, and, even when the cut surface portion cannot undergo complete forming, it is possible to prevent dropping of the filling material, etc. more reliably by performing forming on the portion around of the gate mark.

A housing of the above construction can be obtained, for example, by conducting forming with a jig equipped with a first forming surface for forming the gate mark, and a second forming surface for forming the periphery of the gate mark.

Further, to achieve the above object, there is provided, in accordance with the present invention, a fluid lubrication bearing device including a housing, a bearing sleeve arranged inside the housing, a shaft member inserted into an inner periphery of the bearing sleeve, and a radial bearing portion for supporting the shaft member in a radial direction in a non-contact manner with a lubricating film of a fluid generated in a radial bearing gap between the inner peripheral surface of the bearing sleeve and the outer peripheral surface of the shaft member. The housing is formed by injection molding of resin, and has a gate mark covered with a covering material.

In this construction, the gate mark is sealed against the exterior, so that it is possible to prevent the filling material, etc. contained in the resin from being dropped from the gate mark. The filling material, etc. already dropped from the gate mark prior to the supply of the covering material is also captured by the covering material when the covering material is supplied thereafter, so that such filling material, etc. is prevented from being scattered. Even when the gate mark is not completely covered, and a part of the filling material protrudes from the surface of the covering material, the proximal portion of the protruding portion is grasped by the covering material, so that it is possible to prevent dropping thereof.

When the housing is formed as a bottomed cylinder, it is desirable for the gate mark to be situated at the axial center of the bottom portion thereof. When the gate mark is formed in this way, the gate (point gate) for injecting resin into the cavity is situated at a position of the mold corresponding to the axial center of the end surface of the housing, and the number of gates is one. Thus, by providing the gate as described above, molten resin sent into the cavity through the gate uniformly spreads radially from the center of the bottom portion, and the cavity is uniformly filled with the molten resin without involving any unevenness. Thus, it is possible to avoid generation of a weld, making it possible to obtain in a stable manner a molding improved in terms of dimensional accuracy.

The above-described fluid lubrication bearing device can also be provided as a motor equipped with a rotor magnet and a stator coil.

According to the present invention, it is possible to suppress generation of a contaminant in the housing of a fluid lubrication bearing device of this type, and to maintain a high level of cleanliness in the interior and in the periphery of the bearing device.

DESCRIPTION OF THE PREFERRED EMBODIMENTS

In the following, embodiments of the present invention will be described with reference to the drawings.

Figure 1:
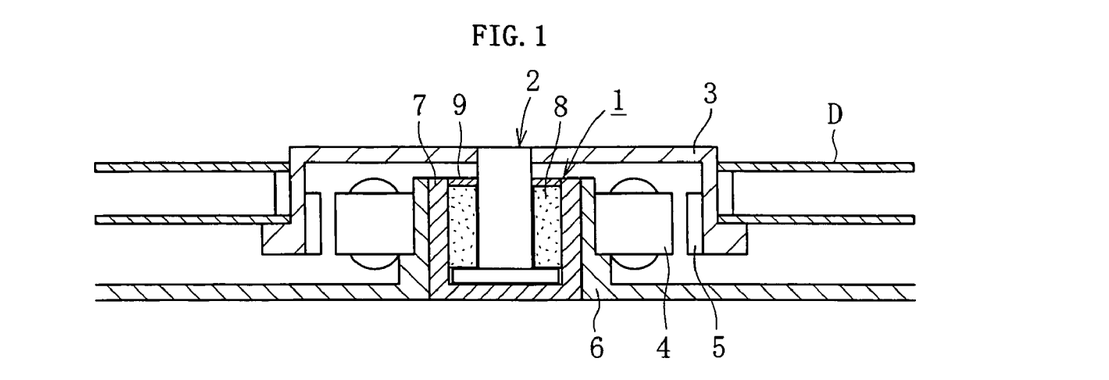
FIG. 1 is a sectional view of a spindle motor for an information apparatus into which a fluid lubrication bearing device according to an embodiment of the present invention is incorporated.

FIG. 1 conceptually shows a construction example of a spindle motor for an information apparatus into which a fluid lubrication bearing device (hydrodynamic bearing device) 1 according to an embodiment of the present-invention is incorporated. This spindle motor for an information apparatus is used in a disc drive device, such as an HDD, and is equipped with the fluid lubrication bearing device 1 rotatably supporting a shaft member 2 in a non-contact manner, a disc hub 3 mounted to the shaft member 2, a stator coil 4 and a rotor magnet 5 that are opposed to each other through the intermediation, for example, of a radial gap, and a bracket 6. The stator coil 4 is mounted to the outer periphery of the bracket 6, and the rotor magnet 5 is mounted to the inner periphery of the disc hub 3. Further, the fluid lubrication bearing device 1 is attached to the inner periphery of the bracket 6. The disc hub 3 retains in its periphery one or a plurality of disc-like information recording mediums (hereinafter simply referred to as the discs) D, such as magnetic discs. In the spindle motor for an information apparatus, constructed as described above, when the stator coil 4 is energized, the rotor magnet 5 is rotated by an exciting force between the stator coil 4 and the rotor magnet 5, and, with that, the disc hub 3 and the discs D retained by the disc hub 3 are rotated integrally with the shaft member 2.

Figure 2:
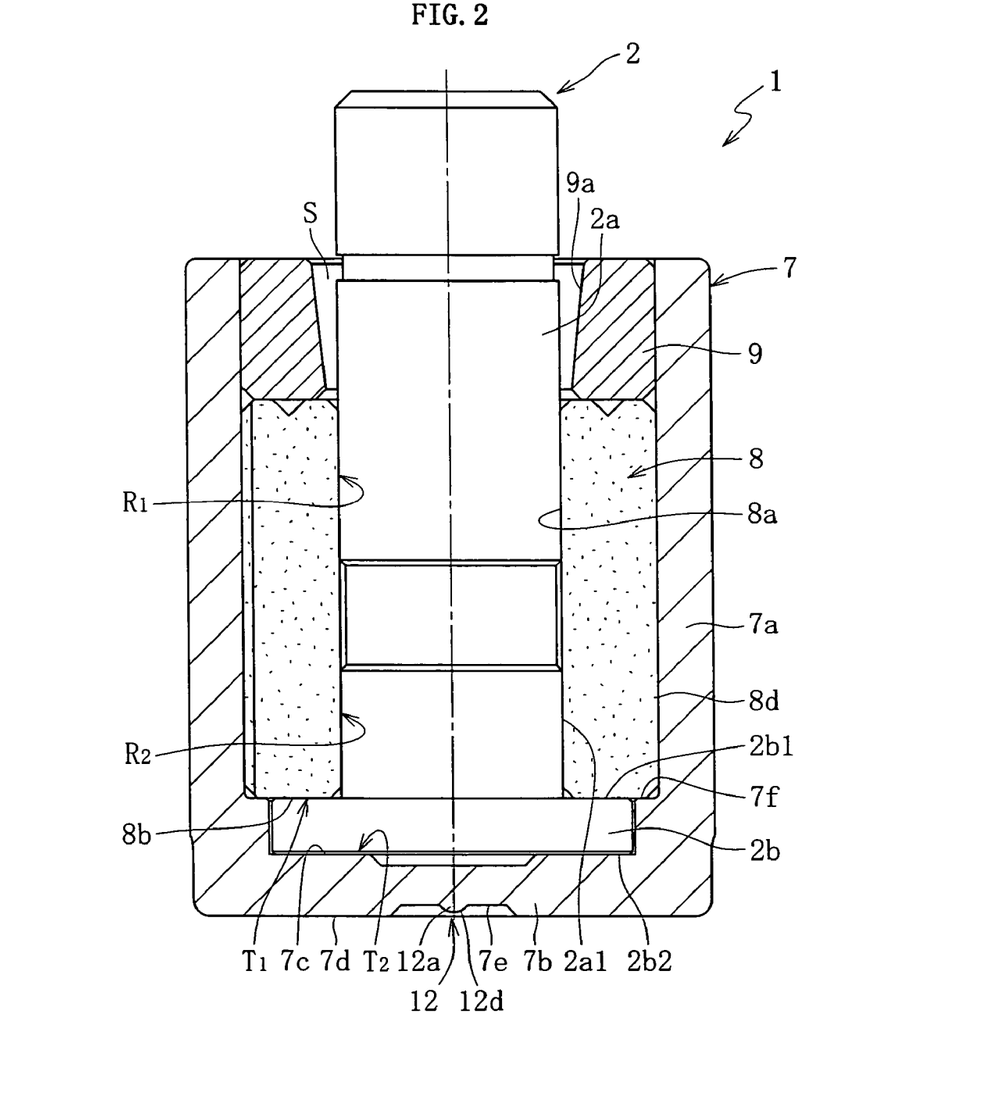
FIG. 2 is a sectional view of a fluid lubrication bearing device.

FIG. 2 shows the fluid lubrication bearing device 1. The fluid lubrication bearing device 1 is composed of a housing 7 having a bottom portion 7b at one end, a bearing sleeve 8 fixed to the housing 7, the shaft member 2 inserted into the inner periphery of the bearing sleeve 8, and a seal member 9. In the following, for the sake of convenience in illustration, the bottom portion 7b side of the housing 7 will be referred to as the lower side, and the side thereof opposite to the bottom portion 7b will be referred to as the upper side.

The shaft member 2 is formed of a metal material, such as stainless steel, and is equipped with a shaft portion 2a and a flange portion 2b provided at the lower end of the shaft portion 2a integrally or separately.

The bearing sleeve 8 is formed in a cylindrical configuration, for example, of a porous material formed of a sintered metal, for example a porous material formed of a sintered metal whose main component is copper, and is fixed at a predetermined position on the inner periphery of the housing 7 described below.

On the inner peripheral surface 8a of the bearing sleeve 8, two upper and lower regions facing the radial bearing gaps of a first radial bearing portion R1 and a second radial bearing portion R2 are provided so as to be axially spaced apart from each other, and, although not shown, in the two regions, there are formed hydrodynamic pressure grooves in a herringbone-like configuration, etc. as hydrodynamic pressure generating portions.

Although not shown, in an annular region constituting all or a part of the lower end surface 8b of the bearing sleeve 8, there is formed hydrodynamic pressure grooves in, for example, a spiral configuration, as a hydrodynamic pressure generating portion.

The housing 7 is formed by injection molding of a resin composition whose base component is a crystalline resin, such as liquid crystal polymer (LCP), polyphenylene sulfide (PPS), or polyetheretherketone (PEEK), or an amorphous resin, such as polyphenyl sulfone (PPSU), polyether sulfone (PES), or polyether imide (PEI). As shown in FIG. 2, the housing 7 is equipped with a cylindrical side portion 7a and a bottom portion 7b provided integrally at the lower end of the side portion 7a. Although not shown, hydrodynamic pressure grooves of, for example, a spiral configuration, are formed in an annular region constituting a part of the upper end surface 7c of the bottom portion 7b and opposed to the flange portion 2b of the shaft member 2. At the center of the lower end surface 7d of the bottom portion 7b, there is formed a recess 7e, at the center of which there is formed a gate mark 12 with a convex surface 12d. Further, above the upper end surface 7c, there is formed, integrally with the side portion 7a, a step portion 7f which is engaged with the lower end surface 8b of the bearing sleeve 8 to effect positioning in the axial direction.

According to the intended object, it is possible for the above-mentioned resin composition forming the housing 7 to be mixed, for example, with a suitable amount of a fiber-like filling material, such as glass fibers, a whisker-like filling material, such as potassium titanate, a scaly filling material, such as mica, or a fiber-like or powder-like conductive filling material, such as carbon fibers, carbon black, graphite, carbon nanomaterial, or various kinds of metal powder.

The housing 7 is manufactured, for example, by the following process.

Figure 3:
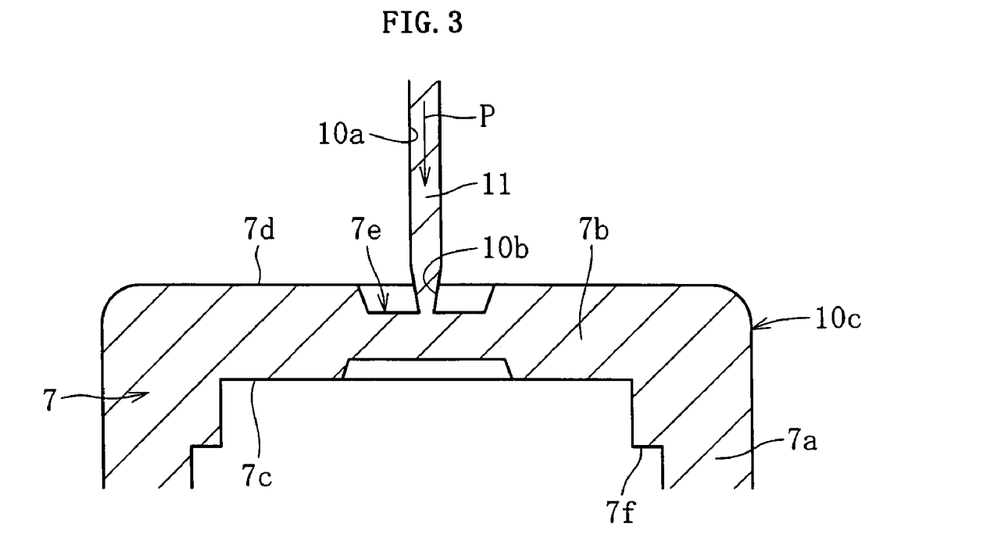
FIG. 3 is a conceptual sectional view illustrating a housing molding process.

FIG. 3 is a conceptual drawing illustrating a process for forming the housing 7. The mold used in the process is composed of a stationary mold and a movable mold, and is equipped with a runner 10a, a point gate 10b, and a cavity 10c. In this embodiment, the point gate 10b is formed at one position of the cavity 10c corresponding to the center of the lower end surface 7d (the upper surface in FIG. 3) of the housing bottom portion 7b. The gate surface area is set to a proper size taking into consideration the viscosity of the molten resin at the time of melting, the injection rate, etc.

Molten resin P injected from the nozzle of an injection molding machine (not shown) passes through the runner 10a and the point gate 10b of the mold, and fills the cavity 10c. By thus pouring the molten resin P into the cavity 10c from the point gate 10b, the cavity 10c is filled uniformly with the molten resin P in the radial direction (the region mainly corresponding to the bottom portion 7b) and the axial direction (the region mainly corresponding to the side portion 7a) of the cavity 10c. This helps to avoid generation of a weld, making it possible to obtain a housing 7 of high dimensional precision.

Figure 4:
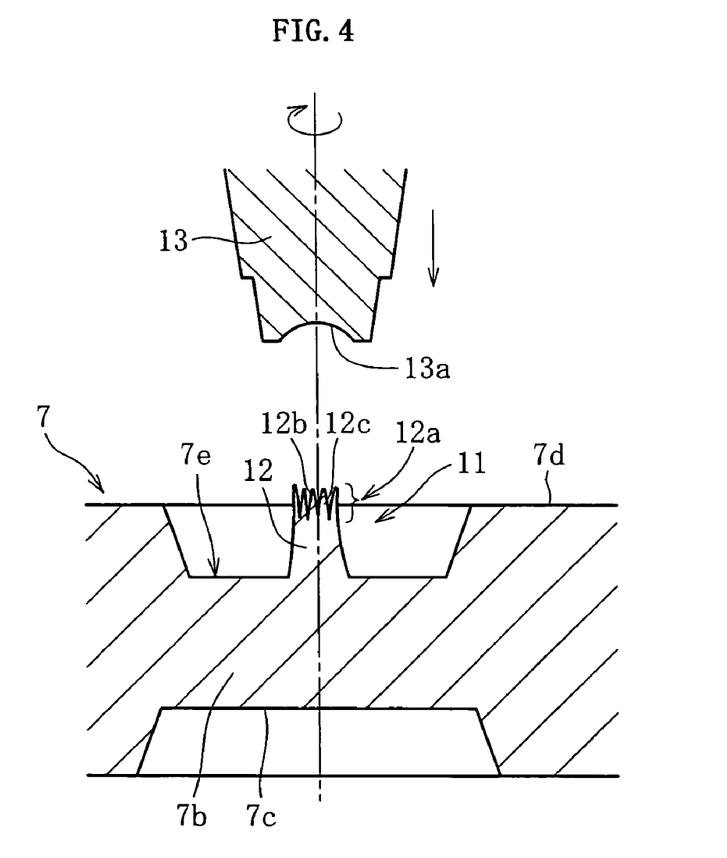
FIG. 4 is a conceptual sectional view of an example of how a housing gate mark is subjected to forming.

When the molten resin P filling the cavity 10c has been solidified, the mold is opened, and the molded housing 7 is extracted. As the mold is opened, a gate resin portion 11 formed in the point gate 10b is cut of, leaving the gate mark 12 on the housing 7. A cut surface 12b formed at the forward end of a cut portion 12a of the gate mark 12 exhibits a sharp asperity feature. The gate mark 12 is formed at a position corresponding to the point gate 10b, which, in this embodiment, is at the axial center of the recess 7e formed in the housing bottom portion 7b as shown in FIG. 4. The distal end of the gate mark partially protrudes beyond the lower end surface 7d of the housing bottom portion 7b.

Figure 5:
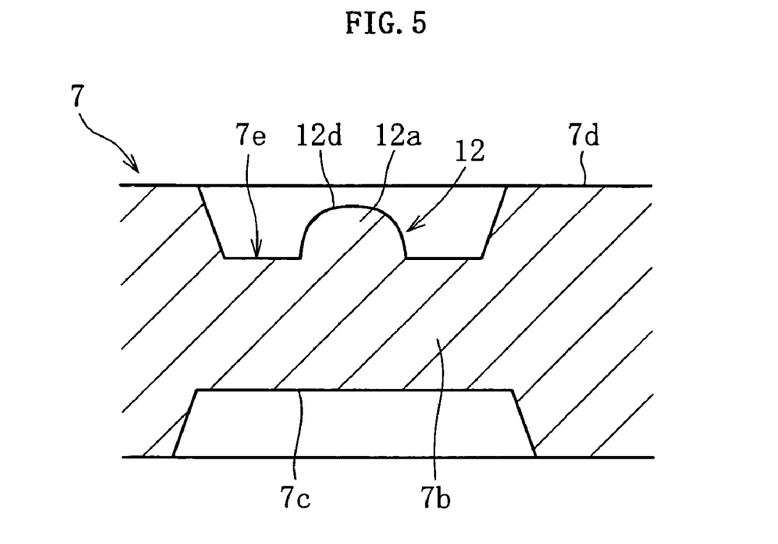
FIG. 5 is an enlarged sectional view of an example of the periphery of a gate mark.

Next, as shown in FIG. 4, a forming jig 13 is pressed against the cut portion 12a of the gate mark 12 to effect pressurization in the axial direction. The jig 13 is equipped with a forming surface 13a shaped as a concave curved surface, for example, a partial concave spherical surface (including a configuration akin to the same). By thus pressing the jig 13 against the gate mark 12, especially the needle-like protrusions 12c of the surface asperities of the cut portion 12a are guided by the pressurizing force then applied, and are pushed and bent plastically in the direction in which they are inclined until they are felled. The felled protrusions 12c cover the cut surface 12b, for example, by being entangled with other protrusions 12c or by being fitted into the recess. Thus, the surface asperities of the cut portion 12a are removed, and, as shown in FIG. 5, the surface 12d of the gate mark 12 is formed into a partial convex spherical configuration corresponding to the configuration of the forming surface 13a. As a result, dropping of the filling material, etc. from the gate mark is suppressed. Further, as shown, for example, in FIG. 5, by pressurizing the cut portion 12a toward the inner peripheral side (opening side) of the housing 7, it is possible to suppress projection of the cut portion 12a beyond the lower end surface 7d.

As noted above, the protrusions 12c of the cut portion 12a are guided by the pressurizing force that is applied by the jig 13 having the forming surface 13a that is shaped as a concave curved surface so that the protrusions 12c are felled to cover the cut surface 12d. This necessarily means that the protrusions 12c are directed by the surface 13a toward the inner side of the gate mark, resulting in that the felled protrusions are directed toward the inner side of the gate mark, which result is generally shown by the surface 12d of the gate mark 12 in FIG. 5.

When, during the above forming, the jig 13 is rotated while pressurizing it in the axial direction, not only a force in the axial direction but also a pressingly bending force in the rotating direction is applied to the protrusions 12c of the gate mark 12. As result, it is possible to impart further regularity to the direction in which the protrusions 12c are felled, making it possible to further smoothen out the surface asperities of the cut portion 12a. When frictional heat is generated through rotation of the jig 13, the resin component in the surface asperities of the gate mark 12 is softened, so that the bending of the protrusions 12c is facilitated, or the force with which the bent protrusions 12c are bound together is enhanced. Thus, the smoothness of the gate mark surface 12d after the forming is enhanced, and it is possible to maintain the configuration of the surface 12d of the gate mark 12 after the forming in a stable manner. Instead of utilizing frictional heat, the heating of the gate mark 12 can also be effected by utilizing a heating device separately arranged.

The shaft member 2 and the bearing sleeve 8 are inserted into the inner periphery of the housing 7 produced as described above, and are fixed to the inner periphery of the housing 7 after the positioning in the axial direction of the bearing sleeve 8 by the step portion 7f. Then, the seal member 9 is fixed to the inner periphery at the upper end of the side portion 7a of the housing 7. Thereafter, the inner space of the housing 7 is filled with a lubricating oil, thereby completing the assembly of the fluid lubrication bearing device 1. At this time, the oil level of the lubricating oil filling the inner space of the housing 7 sealed by the seal member 9 is kept within the range of a seal space S formed between a tapered surface 9a provided in the inner periphery of the seal member 9 and an outer peripheral surface 2a1 of the shaft portion 2a of the shaft member 2.

In the fluid lubrication bearing device 1 constructed as described above, when the shaft member 2 is rotated, a pressure due to a hydrodynamic pressure effect of the lubricating oil is generated in radial bearing gaps between (two upper and lower) hydrodynamic pressure groove forming regions of the inner peripheral surface 8a of the bearing sleeve 8 and the outer peripheral surface 2a1 of the shaft portion 2a opposed thereto, and the shaft portion 2a of the shaft member 2 is rotatably supported in the radial direction in a non-contact manner. As a result, there are formed a first radial bearing portion R1 and a second radial bearing portion R2 supporting the shaft member in the radial direction in a non-contact manner. Further, a pressure due to the hydrodynamic pressure effect of the lubricating oil is generated in a thrust bearing gap between a hydrodynamic pressure groove region formed on an lower end surface 8b of the bearing sleeve 8 and an upper end surface 2b1 of the flange portion 2b opposed to this hydrodynamic pressure groove region, and in a thrust bearing gap between a hydrodynamic pressure groove region formed on the upper end surface 7c of the bottom portion 7b and a lower end surface 2b2 of the flange portion 2b opposed to this hydrodynamic pressure groove region, and the flange portion 2b of the shaft member 2 is rotatably supported in both thrust directions in a non-contact manner. As a result, there are formed a first thrust bearing portion T1 and a second thrust bearing portion T2 supporting the shaft member 2 rotatably in the thrust directions in a non-contact manner.

The present invention is not restricted to the above-described embodiment.

While in the above-described embodiment forming is performed on the gate mark 12 with the jig 13 equipped with the forming surface 13a shaped as a concave spherical surface, it is also possible to perform forming using a jig 13 other than this one. For example, FIG. 6 conceptually shows another form of the forming process for the gate mark 12. The jig 13 used in the drawing is equipped with a forming surface 13a (first forming surface) shaped as a concave spherical surface, and a tapered forming surface 13b (second forming surface) 13b provided on the outer side of the forming surface 13a.

Figure 6:
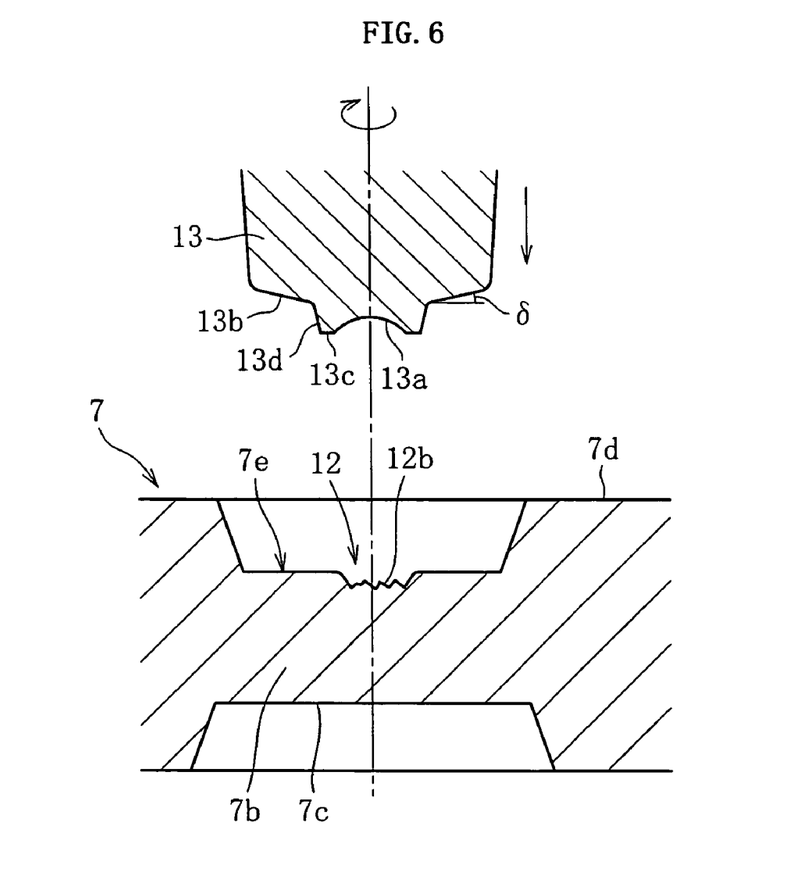
FIG. 6 is a conceptual sectional view of another example of how a housing gate mark is subjected to forming.

As shown in FIG. 6, when, for example, the gate mark 12 is recessed, it is necessary to push in the jig 13 deep into the bottom portion 7b to perform forming over the entire cut surface 12b. In this case, when the jig 13 (shown in FIG. 4) is simply pushed in, the resin of the cut surface 12b portion is forced out into the periphery of the gate mark 12, making it impossible in some cases to perform forming completely on the cut surface 12b. Here, by performing forming using the jig 13 shown in FIG. 6, it is possible to perform forming also on the resin of the cut surface 12b portion forced out into the periphery by the second forming surface 13b provided on the outer side of the first forming surface 13a. As a result, forming is performed on the gate mark 12 and the periphery thereof, making it possible to more reliably prevent dropping of the filling material, etc.

Further, in this embodiment, the jig 13 is equipped with an annular lower end surface 13c connected with the outer side of the first forming surface 13a and a cylindrical surface 13d connecting the lower end surface 13c and the second forming surface 13b. Of these, the second forming surface 13b and the cylindrical surface 13d are inclined with respect to the direction in which the jig 13 is pushed in. Thus, when the jig 13 is pushed in, the surfaces 13b and 13d abut the gate mark and the surface in the periphery thereof at relatively gentle angles, so that it is possible to perform forming without involving generation of edge portions or burrs due to the pushing-in.

Figure 7:
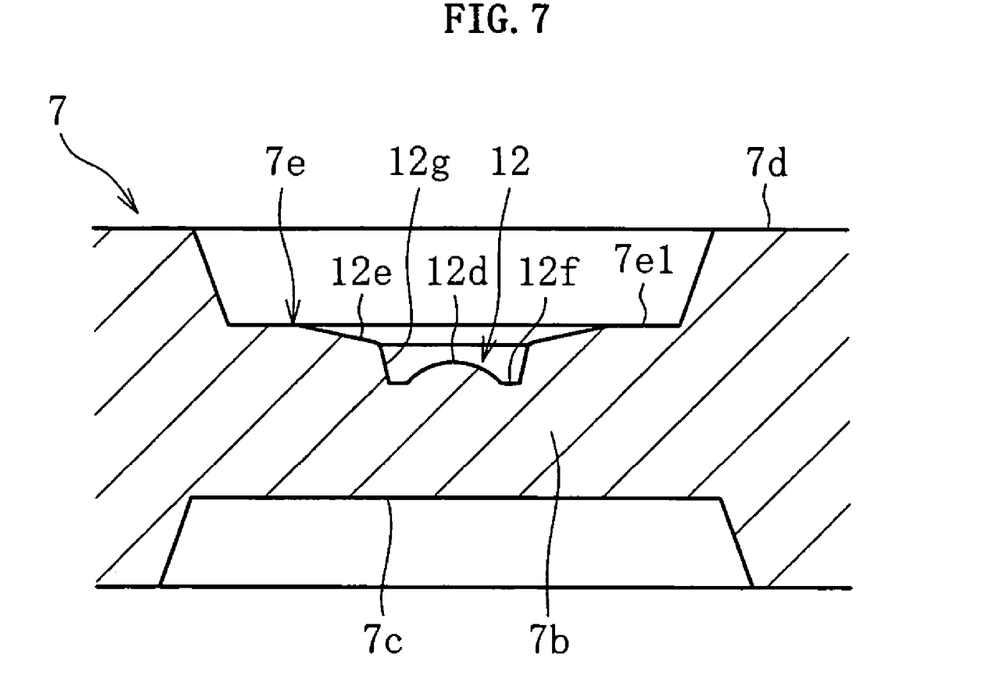
FIG. 7 is an enlarged sectional view of another example of the periphery of a gate mark.

As shown in FIG. 7, there are formed, by performing forming on the housing 7 molded as described above, a semi-spherical surface 12d due to the first forming surface 13a, and a tapered surface 12e due to the second forming surface 13b, and further, between the semi-spherical surface 12d and the tapered surface 12e, surfaces 12f and 12g due to the lower end surface 13c and the cylindrical surface 13d of the jig 13. Further, the flat surface 7e1 in the recess 7e is smoothly connected with the tapered surface 12e, and the tapered surface 12e is smoothly connected with the cylindrical surface 12g.

Figure 8:
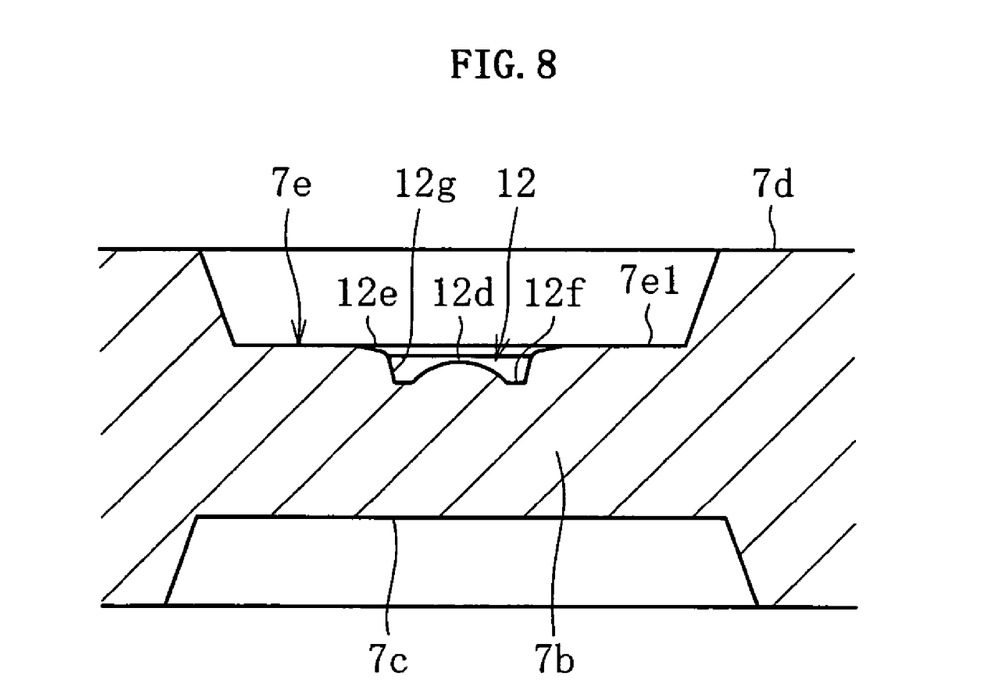
FIG. 8 is an enlarged sectional view of another example of the periphery of a gate mark.

Apart from this, it is also possible to perform forming completely on the cut surface 12b of the convex gate mark 12 shown in FIG. 4 by pushing in the jig 13 with the first and second forming surfaces 13a and 13b deep into the bottom portion 7b, making it possible to prevent dropping of the filling material, etc. from the cut surface 12b more reliably. In this case, as shown in FIG. 8, the surface (convex surface) 12d of the gate mark 12 due to the first forming surface 13a is formed on the lower side (the housing opening side) in the axial direction of the flat surface 7e1 of the recess 7e. Further, around the gate mark 12, there is formed, by the second forming surface 13b, a tapered surface 12e smoothly connected with the flat surface 7e1.

Further, as shown in FIG. 6, by using the jig 13, whose first forming surface 13a for directly forming the gate mark 12 protrudes on the lower side (the housing 7 side) of the second forming surface 13b, the area of the portion of the gate mark 12 directly pushed in is minimized, making it possible to perform forming without involving any excessive load on the housing 7. As a result, it is possible to perform forming while avoiding, as much as possible, deformation of the hydrodynamic pressure groove forming region formed, for example, on the upper end surface 7c of the bottom portion 7b. Further, by adopting the above configuration, the jig can be used regardless of whether the gate mark 12 is convex or concave, which is advantageous from the economical point of view.

In any case, from the viewpoint of smoothly connecting the flat surface 7e1 and the tapered surface 12e with each other, it is desirable for the tapering angle (inclination angle) δ of the second forming surface 13b for forming the tapered surface 12e to be at 10 to 20 degrees with respect to a plane perpendicular to the push-in line (indicated by alternate long and short dashed lines) of the jig 13 shown, for example, in FIG. 6.

Further, while in the above embodiment the gate for injection molding is provided at a single position corresponding to the axis of the bottom portion 7b of the mold (which is, in the example shown, the center of the recess 7e of the lower end surface 7d), this should not be construed restrictively. The present invention is also applicable to a case in which the gate is provided at a position other than the axis of the bottom portion 7b and a case in which the gate is provided at a plurality of positions. Further, the present invention is also applicable to a case in which, instead of a gate of the above-mentioned configuration (i.e., a point gate), there is provided a film-like (annular) gate.

Figure 9:
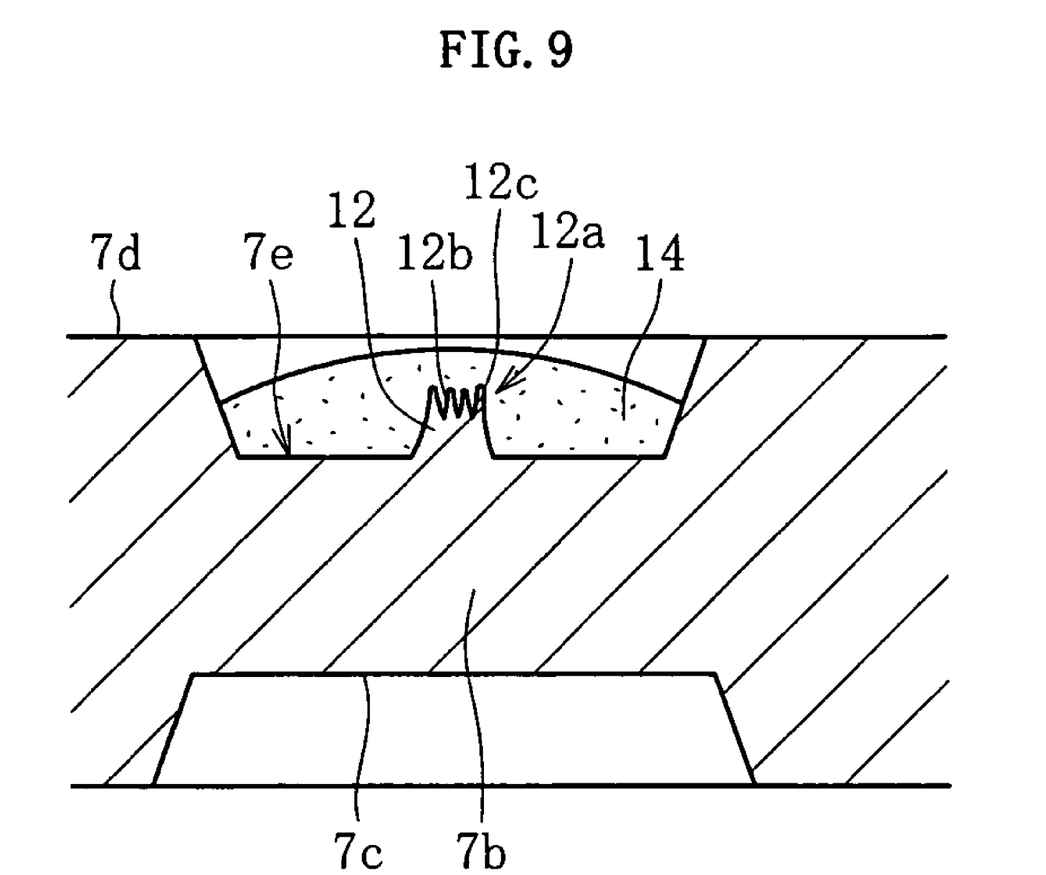
FIG. 9 is a conceptual sectional view illustrating an example of a housing gate mark covering process.

Further, while in the above embodiment forming is performed on the cut portion 12a of the gate mark 12 by the jig 13 after the injection molding of the housing 7, it is also possible to adopt some other method. For example, as shown in FIG. 9, it is also possible to prevent dropping of the filling material, etc. from the cut surface 12b by supplying a covering material 14 to the surface of the gate mark 12 and covering the surface of the gate mark 12 with the covering material 14. As the covering material 14, it is possible to use, for example, a photo-curing resin. In particular, it is desirable to use an ultraviolet-curing resin, which is cured in a short time.

Further, while in the above-described embodiment a hydrodynamic pressure effect of a lubricating fluid is generated by the hydrodynamic pressure grooves in a herringbone-like or spiral configuration formed in the radial bearing portions R1 and R2 and the thrust bearing portions T1 and T2, this should not be construed restrictively.

For example, it is also possible to adopt so-called step bearings or multi-arc bearings as the radial bearing portions R1 and R2.

Although not shown, the step bearings may be formed, for example, of a plurality of axial-groove-shaped hydrodynamic pressure grooves provided at predetermined circumferential intervals in the regions (the region constituting the radial bearing surfaces) of the inner peripheral surface 8a of the bearing sleeve 8 facing the radial bearing gap. One or both of the radial bearing portions R1 and R2 can be formed by such step bearings.

Although not shown, the multi-arc bearings may be formed, for example, of three arcuate surfaces (so-called three-arc bearing) formed in the regions of the inner peripheral surface 8a of the bearing sleeve 8 constituting the radial bearing surfaces. The centers of curvature of the three arcuate surfaces are offset from the axial center of the bearing sleeve 8 (the shaft portion 2a) by the same distance. In each of the regions defined by the three arcuate surfaces, the radial bearing gap is configured such that it is gradually diminished in a wedge-like fashion in both circumferential directions. Thus, when the bearing sleeve 8 and the shaft portion 2a rotate relative to each other, the lubricating fluid in the radial bearing gap is pushed in toward the minimum gaps diminished in a wedge-like fashion, and increases in pressure. By the hydro-dynamic pressure-effect of the lubricating fluid of the multi-arc bearing, constructed as described above, the bearing sleeve 8 and the shaft portion 2a are supported in a non-contact manner, thus forming one or both of the radial bearing portions R1 and R2. It is also possible to form at the border portions between the three arcuate surfaces axial grooves one step deeper that are called separation grooves.

The multi-arc bearing may adopt a construction other than the above-described one. For example, although not shown, it is also possible to form the regions of the inner peripheral surface 8a of the bearing sleeve 8 constituting the radial bearing surfaces with three arcuate surfaces (so-called three-arc bearing), and to configure each of the regions defined by the three arcuate surfaces such that it is gradually diminished in a wedge-like fashion in one circumferential direction. A multi-arc bearing of this construction is sometimes referred to as a tapered bearing. Further, it is also possible to form at the border portions between the three arcuate surfaces axial grooves one step deeper that are called separation grooves. In this case, when the bearing sleeve 8 and the shaft portion 2a rotate relative to each other in a predetermined direction, the lubricating fluid in the radial bearing gaps is pushed in toward the minimum gaps diminished in a wedge-like fashion, and increases in pressure. By the hydrodynamic pressure effect of the lubricating fluid of the multi-arc bearing, constructed as described above, the bearing sleeve 8 and the shaft portion 2a are supported in a non-contact manner, thus forming one or both of the radial bearing portions R1 and R2.

The multi-arc bearing may adopt still another construction. For example, although not shown, it is also possible to form, in a three-arc bearing as mentioned above, predetermined circumferential regions on the minimum gap side of the three arcuate surfaces by coaxial arcs of the same diameter whose center of curvature is the axial center of the bearing sleeve 8 (shaft portion 2a). Thus, in each of the predetermined regions, the radial bearing gap (the minimum gap) is of a fixed dimension. A multi-arc bearing of this construction is referred to as a tapered/flat bearing, and is used to form one or both of the radial bearings R1 and R2.

While the multi-arc bearings of the above examples are so-called three-arc bearings, this should not be construed restrictively. It is also possible to adopt a so-called four-arc bearing, a five-arc bearing, or, further, a multi-arc bearing formed by six or more arcuate surfaces. Further, when forming the radial bearing portion with a step bearing, a multi-arc bearing, etc., it is also possible to form a single radial bearing portion over the entire vertical region of the inner peripheral surface 8a of the bearing sleeve 8 instead of forming two radial bearing portions axially spaced apart from each other as in the case of the radial bearing portions R1 and R2.

Further, one or both of the thrust bearing portions T1 and T2 may also be formed, for example, by so-called step bearings, so-called undulated bearings (with undulated steps), etc. in which a plurality of radial-groove-shaped hydrodynamic pressure grooves are provided at predetermined circumferential intervals in, for example, the regions constituting the thrust bearing surfaces.

Further, the radial bearing portions R1 and R2 and the thrust bearing portions T1 and T2 may be formed by bearings other than hydrodynamic bearings. For example, it is also possible to use pivot bearings as the thrust bearing portions, and cylindrical bearings as the radial bearing portions.

Further, while in the above embodiments a lubricating oil is used as the fluid filling the interior of the fluid lubrication bearing device 1 and forming lubricating films in the radial bearing gap between the bearing sleeve 8 and the shaft member 2 and in the thrust bearing gaps between the bearing sleeve 8, the housing 7, and the shaft member 2, it is also possible to use some other fluid capable of forming lubricating films between the bearing gaps, for example, a gas, such as air, or a lubricant with fluidity, such as a magnetic fluid.

What is claimed is:
1. A fluid lubrication bearing device comprising:
a housing;
a bearing sleeve arranged inside said housing;
a shaft member inserted inside an inner periphery of said bearing sleeve;
a radial bearing portion for supporting said shaft member in a radial direction in a non-contact manner with fluid pressure generated in a radial bearing gap between an inner peripheral surface of said bearing sleeve and an outer peripheral surface of said shaft member;

wherein said housing is formed by a process comprising injection molding a resin containing a filling material such that said housing has:
- a bottom portion formed integrally with said housing,
- a concave formed in said bottom portion, and
- a gate mark formed on a bottom surface of said concave of said housing;

wherein said gate mark has a cut portion formed at a distal end of said gate mark; and wherein a covering material is provided in said concave to cover the entire said gate mark, including said cut portion at said distal end of said gate mark; and wherein said covering material is positioned higher than said cut portion formed at said distal end of said gate mark.

2. The fluid lubrication device of claim 1, wherein said housing is formed as a bottomed cylinder and said gate mark is at an axial center of said bottom surface.

3. A motor comprising:
   the fluid lubrication bearing device according to claim 2;
   a rotor magnet; and
   a stator coil.

4. A motor comprising:
   the fluid lubrication bearing device according to claim 1;
   a rotor magnet; and
   a stator coil.

* * * * *